US010438781B2

(12) United States Patent
Yamaguchi

(10) Patent No.: US 10,438,781 B2
(45) Date of Patent: Oct. 8, 2019

(54) MEASUREMENT ERROR CORRECTION METHOD BASED ON TEMPERATURE-DEPENDENT DISPLACEMENT IN MEASUREMENT DEVICE AND MASS SPECTROMETER USING THE SAME METHOD

(71) Applicant: SHIMADZU CORPORATION, Kyoto-shi, Kyoto (JP)

(72) Inventor: Shinichi Yamaguchi, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/768,174

(22) PCT Filed: Oct. 16, 2015

(86) PCT No.: PCT/JP2015/079253

§ 371 (c)(1),
(2) Date: Apr. 13, 2018

(87) PCT Pub. No.: WO2017/064802

PCT Pub. Date: Apr. 20, 2017

(65) Prior Publication Data

US 2018/0358215 A1 Dec. 13, 2018

(51) Int. Cl.
*H01J 49/00* (2006.01)
*G01N 27/62* (2006.01)
*H01J 49/40* (2006.01)

(52) U.S. Cl.
CPC .......... *H01J 49/0009* (2013.01); *G01N 27/62* (2013.01); *H01J 49/40* (2013.01)

(58) Field of Classification Search
USPC .......................................................... 250/282
See application file for complete search history.

(56) References Cited

U.S. PATENT DOCUMENTS 6,465,777 B1 * 10/2002 Rache .................... H01J 49/40 250/281
6,998,607 B1 * 2/2006 Davis ..................... H01J 49/40 250/287

(Continued)

FOREIGN PATENT DOCUMENTS

EP 1 784 851 A1 5/2007
JP 6-229705 A 8/1994

(Continued)

OTHER PUBLICATIONS

"Agilent 7200B Shiriizu GC/Q-TOF: Tayouna Apurikeeshon De Saikou No Teisei To Teiryou Wo Jitsugen (Agilent 7200B Series GC/Q-TOF: Highest Level of Qualitative and Quantitative Determinations Achieved with a Variety of Applications", [online], Agilent Technologies, Inc., [accessed on Sep. 15, 2015].

(Continued)

*Primary Examiner* — Phillip A Johnston
(74) *Attorney, Agent, or Firm* — Sughrue Mion, PLLC

(57) ABSTRACT

A columnar rod reference member made of a material whose coefficient of thermal expansion is different from a flight tube is placed in contact with the tube. One end of the tube and o the reference member are fixed to each other with a fixture part. A distance measurement sensor measures the difference in length between the tube and the reference member whose lengths fluctuate due to a change in temperature. A displacement of the difference in length, as expressed by a proportion, is larger than that of the length of the flight tube. The difference in length is far smaller than the length of the flight tube. This improves detection of the displacement due to thermal expansion with a strain gauge or sensor. The m/z values in mass spectrum data are corrected based on the measured values of the displacement, (Continued)

whereby a highly accurate mass discrepancy correction is achieved.

6 Claims, 1 Drawing Sheet

(56) References Cited

U.S. PATENT DOCUMENTS

| | | | | |
|---|---|---|---|---|
| 7,183,543 | B1 * | 2/2007 | Overney | H01J 49/40 250/287 |
| 7,239,397 | B2 * | 7/2007 | Badami | G01B 11/161 356/485 |
| 8,013,293 | B2 * | 9/2011 | Yamauchi | G01N 27/62 250/287 |
| 2006/0043283 | A1 | 3/2006 | Davis et al. | |
| 2010/0176292 | A1 | 7/2010 | Yamauchi et al. | |

FOREIGN PATENT DOCUMENTS

| | | | |
|---|---|---|---|
| JP | 7-27572 | A | 1/1995 |
| JP | 9-246792 | A | 9/1997 |
| JP | 2003-068246 | A | 3/2003 |
| JP | 2008-511964 | A | 4/2008 |
| JP | 4816794 | B2 | 11/2011 |
| WO | 2006/026391 | A1 | 3/2006 |

OTHER PUBLICATIONS

International Search Report for PCT/2015/079253 dated Jan. 12, 2016 (PCT/ISA/210).

Written Opinion for PCT/2015/079253 dated Jan. 12, 2016 (PCT/ISA/237).

International Preliminary Report on Patentability PCT/2015/079253 dated Jan. 12, 2016 (PCT/IB/373).

Communication dated Aug. 20, 2019 from the Japanese Patent Office in application No. 2017-545062.

* cited by examiner

MEASUREMENT ERROR CORRECTION METHOD BASED ON TEMPERATURE-DEPENDENT DISPLACEMENT IN MEASUREMENT DEVICE AND MASS SPECTROMETER USING THE SAME METHOD

TECHNICAL FIELD

The present invention relates to a method for correcting an error or discrepancy in measurement data caused by a thermal expansion of various component members in a measurement device, as well as a mass spectrometer using the same method.

BACKGROUND ART

In a normal type of time-of-flight mass spectrometer (TOFMS), a fixed amount of acceleration energy is imparted to ions derived from a sample component. The ions are introduced into a field-free flight space formed within a flight tube and made to fly in the same space. For each of the ions, the period of time required for the ion to fly a specific distance is measured, and the mass-to-charge ratio m/z of the ion is calculated based on its time of flight. Accordingly, if the flight distance is changed due to a thermal expansion of the flight tube along with a rise in the ambient temperature, the time of flight of each ion also changes, causing a discrepancy of its mass-to-charge ratio (which is hereinafter simply called the "mass discrepancy"). Therefore, various measures have conventionally been taken to avoid a mass discrepancy due to a thermal expansion of the flight tube.

Those measures can be roughly divided into two types: The first type of measure is to directly suppress the thermal expansion of the flight tube. The second type of measure is to perform data processing for correcting a mass discrepancy resulting from a thermal expansion of the flight tube while allowing the thermal expansion itself.

A specific example of the first type of measure is to create the flight tube from a material having a low coefficient of thermal expansion. Another example is to place the flight tube within a container which is temperature-controlled or is insusceptible to a change in the external temperature so as to suppress the temperature change of the flight tube even under a changing ambient temperature. For example, in a mass spectrometer described in Non Patent Literature 1, the flight tube is made of Fe—Ni36% (Inver®), which is a material having a low coefficient of thermal expansion, and this flight tube is placed within a vacuum-insulated container to suppress the thermal expansion of the flight tube and achieve a high level of mass accuracy.

On the other hand, an example of the second type of measure is to correct data obtained for a measurement target component, based on the result of a measurement of a reference sample having an exactly known mass-to-charge ratio. As is commonly known, this can be divided into an internal reference method, in which the reference sample is simultaneously subjected to the measurement with the measurement target component, and an external reference method, in which the reference sample is subjected to the measurement separately from the measurement target component. These methods can be considered as a technique in which a change in the flight distance is indirectly measured in the form of a change in the time-of-flight of an ion originating from a reference sample component.

Another example of the second type of measure is to directly measure the length of the flight tube with a laser distance meter and correct the data obtained for a measurement target component, based on the result of that measurement, as in the mass spectrometer described in Patent Literature 1.

Each of the conventional correction methods described thus far has advantages and disadvantages.

For example, materials which have low coefficients of thermal expansion, such as Fe—Ni36%, are expensive as compared to commonly used kinds of metal, such as stainless steel. Flight tubes are considerably large members. Using a material having a low coefficient of thermal expansion for such a member inevitably leads to a dramatic increase in the cost of the device. Placing a flight tube within an insulated container as in the device described in Non Patent Literature 1 also causes a dramatic increase in the cost of the device.

On the other hand, in the case of the correction using the result of a measurement of a reference sample, it is necessary to prepare the reference sample, and the analysis operator is forced to bear that burden. Furthermore, performing a measurement of a reference sample other than a measurement target component may cause the problem of a contamination in the device or a deterioration in the throughput of an analysis for the measurement target component.

In the method of directly measuring the length of the flight tube, it is necessary to measure an extremely small displacement, which is on the order of 1 ppm, for a comparatively large scale (e.g. 1 m or even larger). As described in Patent Literature 1, a laser distance meter is suitable for a high-precision measurement on such a large scale. However, laser distance meters are expensive and lead to a dramatic increase in the cost of the device.

CITATION LIST

Patent Literature

Patent Literature 1: JP 2003-68246 A

Non Patent Literature

Non Patent Literature 1: "Agilent 7200B Shiriizu GC/Q-TOF: Tayouna Apurikeeshon De Saikou No Teisei To Teiryou Wo Jitsugen (Agilent 7200B Series GC/Q-TOF: Highest Level of Qualitative and Quantitative Determinations Achieved with a Variety of Applications", [online], Agilent Technologies, Inc., [accessed on Sep. 15, 2015], the Internet

SUMMARY OF INVENTION

Technical Problem

A similar problem to the one caused by a thermal expansion of a flight tube in a time-of-flight mass spectrometer can also occur in other types of high-precision mass spectrometers, such as a Fourier transform ion cyclotron resonance mass spectrometer using an Orbitrap™ or similar device. Furthermore, the problem is not limited to mass spectrometers. For example, a similar problem can also occur in other types of measurement devices, such as an ultraviolet-visible spectrophotometer in which analysis data may fluctuate due to a change in the optical path length through a sample solution caused by a change in temperature. That is to say, the previously described problem is common to any measurement device in which a thermal expansion of a component member results in an error or discrepancy in measurement data to be eventually obtained.

The present invention has been developed to solve the previously described problem. Its objective is to provide a measurement error correction method with which an error or discrepancy in measurement data due to a thermal expansion of a component member in a measurement device can be corrected without significantly increasing the cost of the device. Another objective of the present invention is to provide a mass spectrometer in which such a measurement error correction method is employed to achieve a high level of mass accuracy without significantly increasing the cost of the device.

Solution to Problem

A first aspect of the present invention developed for solving the previously described problem is a measurement error correction method to be used in a measurement device configured to perform a predetermined measurement and acquire measurement data, for correcting an error or discrepancy in measurement data due to a thermal expansion of a specific component member included in the measurement device and having a length contributing to the measurement data, the measurement error correction method including:

placing a reference member in the same temperature atmosphere as the component member, the reference member made of a material whose coefficient of thermal expansion is different from the coefficient of thermal expansion of the component member; and measuring a difference in length between the component member and the reference member, with the two members individually demonstrating a thermal expansion in the same temperature atmosphere, and correcting measurement data obtained by a measurement, based on the difference in length.

Although the coefficient of thermal expansion of the reference member only needs to be different from that of the component member in the measurement device, the difference in coefficient of thermal expansion between the two members should preferably be as large as possible. The length of the reference member does not need to be previously known. Although the component member and the reference member may have a considerable difference in length, this difference in length should preferably be small enough to allow the use of an inexpensive sensor, such as a strain gauge or capacitance sensor, for the measurement of the difference in length. Accordingly, for example, it is preferable to determine the length of the reference member so that the difference in length will become approximately zero under a reference temperature (e.g. normal room temperature), and the difference in length will increase as the temperature rises from the reference temperature.

The meaning of the "length" of the component member or reference member depends on the shape of the member: The "length" of a member having a linearly extending shape means the distance between the two ends of the member as measured in its extending direction, while the "length" of a member having a curved shape can be defined as the gap or distance between the two ends of the member as measured along the straight line connecting the two ends (i.e. the shortest distance between the two ends).

In the measurement error correction method according to the first aspect of the present invention, if the measurement device is a time-of-flight mass spectrometer, the component member is a flight tube within which a flight space is formed. As noted earlier, one method has conventionally been known in which measurement data are corrected based on a directly measured length of the flight tube. By comparison, the measurement error correction method according to the first aspect of the present invention measures the difference in length between the flight tube and the reference member instead of directly measuring the length of the flight tube. An error or discrepancy in measurement data due to a thermal expansion of the component member is corrected based on the measured difference in length.

The difference in length can be made to be far smaller than the length of the flight tube itself. Therefore, it can be measured with a comparatively high level of accuracy even with an inexpensive sensor which can only measure short distances or narrow gaps, such as a strain gauge or capacitance sensor. Additionally, by an appropriate choice of the coefficient of thermal expansion of the reference member, the proportion of the change in the difference in length for a specific change in temperature can be made to be greater than that of the change in the length of the flight tube itself. Accordingly, the change in the difference in length due to a temperature change can be accurately measured, so that the correction accuracy of the measurement data can be improved. Additionally, a highly accurate correction of the measurement data can be achieved even when a sensor having a lower measurement accuracy than a laser distance meter is used.

In the case where the measurement device is a time-of-flight mass spectrometer as described earlier, the reference member may preferably be an elongated member extending in the same direction as the flight tube, and the reference member may be arranged so that one end of the reference member and one end of the flight tube are held to be level with each other while the distance between the other end of the reference member and the other end of the flight tube is to be measured as the difference in length between the two members. The reference member may be placed in contact with the flight tube, or the reference member may be placed in the vicinity of the flight tube, with a certain distance in between.

The second aspect of the present invention developed for solving the previously described problem is a mass spectrometer employing the measurement error correction method according to the first aspect of the present invention. Specifically, it is a time-of-flight type of mass spectrometer having a flight tube within which a flight space is formed, the mass spectrometer including:

a) a reference member located in the same temperature atmosphere as the flight tube, the reference member being an elongated object extending in the same direction as the flight tube and made of a material whose coefficient of thermal expansion is different from the coefficient of thermal expansion the flight tube, with one of end of the reference member held to be level with one end of the flight tube;

b) a distance meter for measuring the distance between an end portion of the reference member opposite from the side on which the one end of the reference member is held to be level with the one end of the flight tube, and an end portion of the flight tube opposite from the same side; and c) a correction processor for correcting a time of flight obtained by mass spectrometry performed for a sample or a mass-to-charge ratio obtained by a conversion of the time of flight, based on a result of a measurement by the distance meter.

In the mass spectrometer according to the second aspect of the present invention, as described earlier, the difference between the length of the flight tube and that of the reference member can be made to be sufficiently small so that an inexpensive sensor which can only measure short distances, such as a strain gauge or capacitance sensor, can be used as the distance meter. Additionally, by an appropriate choice of the coefficient of thermal expansion of the reference member, the proportion of the change in the difference in length for a specific change in temperature can be made to be greater than that of the change in the length of the flight tube itself, so that a change in the length of the flight tube due to a temperature change can be accurately detected. The correction processor corrects a time of flight obtained by mass spectrometry performed for a sample-derived ion or a mass-to-charge ratio obtained by a conversion of the time of flight, based on a measurement result obtained by the distance meter at almost the same time as the measurement for the time of flight. Accordingly, a mass discrepancy due to a thermal expansion of the flight tube can be accurately corrected.

The mass spectrometer according to the second aspect of the present invention may further include a discrepancy information storage section for previously storing a relationship between the result of the measurement by the distance meter and a discrepancy in time of flight or mass-to-charge ratio, and the correction processor may be configured to obtain, from the discrepancy information storage section, a discrepancy corresponding to the result of the measurement by the distance meter and correct the time of flight or mass-to-charge ratio.

The information stored in the discrepancy information storage section does not need to be updated as long as the flight tube or other related components are not replaced. Accordingly, the manufacturer of the mass spectrometer can experimentally prepare the information and store it in the device beforehand.

Advantageous Effects of the Invention

With the measurement error correction method based on a temperature-dependent displacement in a measurement device according to the first aspect of the present invention, an error or discrepancy in measurement data due to a thermal expansion of a component member in the measurement device can be accurately corrected without significantly increasing the cost of the device. The present method does not force an analysis operator to perform burdensome tasks that are required in the case of a correction by the internal or external standard method. With the mass spectrometer according to the second aspect of the present invention employing the present measurement error correction method, a high level of mass accuracy can be achieved without significantly increasing the cost of the device.

DESCRIPTION OF EMBODIMENTS

A time-of-flight mass spectrometer (TOFMS) as one embodiment of the mass spectrometer employing a measurement error correction method based on a temperature-dependent displacement in a measurement device according to the present invention is hereinafter described with reference to the attached drawings.

Figure 1:
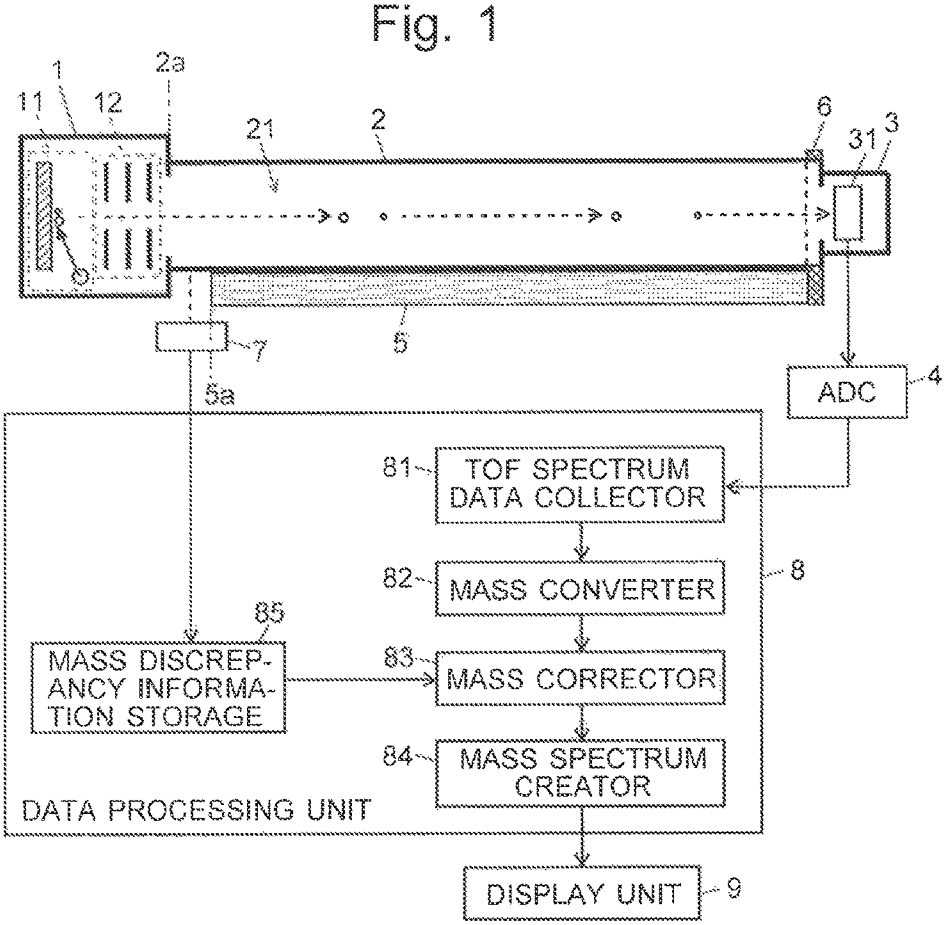
FIG. 1 is a schematic configuration diagram of one embodiment of the mass spectrometer employing a measurement error correction method based on a temperature-dependent displacement in a measurement device according to the present invention.

FIG. 1 is a configuration diagram of the main components of the TOFMS according to the present embodiment.

The TOFMS according to the present embodiment includes an ionization chamber 1 containing an ionizer 11 and an accelerator 12, as well as a detection chamber 3 containing a detector 31. The two chambers are respectively attached to the two end faces of a flight tube 2 having a substantially cylindrical shape. A predetermined level of direct voltage +V is applied to the metallic flight tube 2. A flight space 21 having a high vacuum atmosphere with neither an electric field nor a magnetic field is created within the flight tube 2.

Ions are generated from a sample in the ionizer 11. Those sample-component-derived ions are given a predetermined amount of kinetic energy in the accelerator 12 and sent into the flight space 21. As indicated by the dashed line in FIG. 1, the ions fly through the flight space 21 and reach the detector 31. The speed of an ion within the flight space 21 depends on the mass-to-charge ratio of the ion. Therefore, after being almost simultaneously introduced into the flight space 21, the ions having different mass-to-charge ratios are separated from each other during their flight and eventually reach the detector 31, demonstrating certain intervals of time.

Detection signals produced by the detector 31 are converted into digital data at predetermined intervals of sampling time in an analogue-to-digital converter (ADC) 4 and sent to a data processing unit 8. The data processing unit 8 includes a TOF spectrum data collector 81, mass converter 82, mass corrector 83, mass spectrum creator 84, mass discrepancy information storage section 85 and other functional blocks.

If the flight tube 2 thermally expands and its length in the axial direction (or horizontal direction in FIG. 1) changes, the flight distance also changes. This causes a change in the time of flight for an ion having the same mass-to-charge ratio, which leads to a discrepancy in mass-to-charge ratio, i.e. a mass discrepancy. The TOFMS according to the present invention has a characteristic configuration for correcting this mass discrepancy. The configuration includes a reference member 5 and a distance measurement sensor 7, in addition to the mass corrector 83 and the mass discrepancy information storage section 85 mentioned earlier.

The reference member 5 is an elongated member, such as a columnar rod. This member is made of a material whose coefficient of thermal expansion is different from the flight tube 2. The reference member 5 is placed in contact with the flight tube 2 and extends in the same direction as the flight tube 2. One end of the reference member 5 and one end of the flight tube 2 (in FIG. 1, the right end, which is the exit end for ions) are fixed to each other with a fixture part 6. Since the reference member 5 is placed in contact with the flight tube 2, it is possible to consider that the two components have approximately equal temperatures.

In the aforementioned mass spectrometer described in Patent Literature 1, the length of the flight tube is constantly measured with a laser distance meter, and a mass discrepancy due to a thermal expansion of the flight tube is corrected based on the measured length. By comparison, in the TOFMS according to the present embodiment, the mass discrepancy is corrected by performing a measurement as will be hereinafter described with reference to FIG. 2, which shows the flight tube 2 and the reference member 5 in a simplified form.

Figure 2:
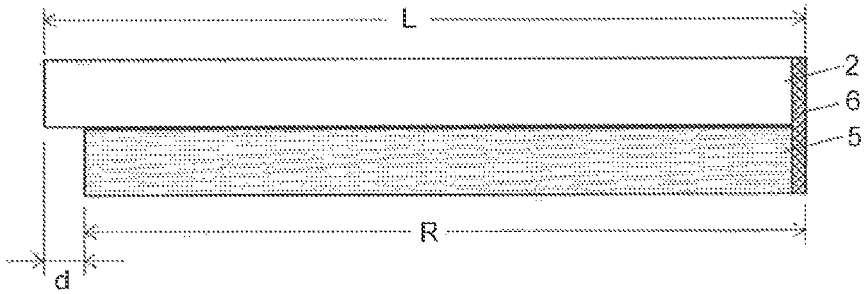
FIG. 2 is a diagram illustrating the flight tube and the reference member in FIG. 1 in a simplified form.

As shown in FIG. 2, let L denote the length of the flight tube 2 and R denote the length of the reference member 5. The two lengths L and R should preferably be close to each other (or equal to each other at a specific temperature). It is hereinafter assumed that L>R. Since the right end of the flight tube 2 and that of the reference member 5 are made to be level with each other as well as fixed to each other with the fixture part 6, the difference d in length (=L−R) between the flight tube 2 and the reference member 5 emerges on the left-end side of these two members, as shown in FIG. 2. The difference d in length (=L−R) is far smaller than L. L, R and d all depend on the temperature; i.e. they are functions of the temperature t. Accordingly, they will hereinafter be denoted by L(t), R(t) and d(t).

Now, suppose that $d(t_0)=d_0$, $L(t_0)=L_0$ and $R(t_0)=R_0$ at a reference temperature $t_0$. Then, the following equations (1) to (3) hold true:

$$d(t)=L(t)-R(t) \tag{1}$$

$$L(t)=L_0+\alpha L_0(t-t_0)=L_0\{1+\alpha(t-t_0)\}=L_0(1+\alpha\Delta t) \tag{2}$$

$$R(t)=R_0+\beta R_0(t-t_0)=R_0\{1+\oplus(t-t_0)\}=R_0(1+\beta\Delta t) \tag{3}$$

where α is the coefficient of thermal expansion of the flight tube 2, β is the coefficient of thermal expansion of the reference member 5, and $\Delta t$ (=$t-t_0$) is a temperature change from the reference temperature $t_0$. Substituting equations (2) and (3) into equation (1) yields the following equation (4):

$$d(t)=L_0-R_0+\Delta t(\alpha L_0-R_0) \tag{4}$$

If the coefficient of thermal expansion β of the reference member 5 is sufficiently smaller than the coefficient of thermal expansion α of the flight tube 2, then $0<\beta<<\alpha$, and β can be ignored. Accordingly, equation (4) can be rewritten as equation (5):

$$d(t)=d_0+\Delta t\alpha L_0 \tag{5}$$

For a thermal expansion of each of the flight tube 2 and the reference member 5, the displacement of the difference d in length, as expressed by a ratio, is given by equation (6):

$$\{d(t)-d(t_0)\}/d(t_0)=\{d(t)/d(t_0)\}-1=\{d(t)/d_0\}-1=\alpha(L_0/d_0)\Delta t \tag{6}$$

By comparison, if the length of the flight tube 2 is directly measured, the ratio of the displacement of that length due to a temperature change is given by the following equation (7):

$$\{L(t)-L(t_0)\}/L(t_0)=\{L(t)/L(t_0)\}-1=\alpha\Delta t \tag{7}$$

A comparison between equations (6) and (7) demonstrates that the ratio of the displacement due to a temperature change is increased to ($L_0/d_0$) times by measuring the difference d in length as in the present embodiment. This means a corresponding increase in the ratio of the displacement to be measured for the same amount of temperature change. Therefore, it is possible to consider that the measurement is easier to perform, and its accuracy can be more easily improved than in the conventional case of measuring the entire length of the flight tube 2. Furthermore, since the difference $d_0$ in length at the reference temperature $t_0$ is far smaller than the length $L_0$ of the flight tube 2, there is no need to use a laser distance meter or similar distance meter capable of accurately measuring a long distance. Various types of sensors capable of measuring an extremely short distance or gap can be used, such as a strain gauge or capacitance sensor.

In the previous calculation, the coefficient of thermal expansion β of the reference member 5 was ignored. If the value of β is considerably large and cannot be ignored in comparison with α, the following equation (8) should be used in place of equation (5):

$$d(t)=d_0+\Delta t(\alpha L_0-\beta R_0) \tag{8}$$

Since the approximation of $L_0 \approx R_0$ holds true, equation (8) can be rewritten as equation (9):

$$d(t)=d_0+\Delta t(\alpha-\beta)L_0 \tag{9}$$

For a thermal expansion of each of the flight tube 2 and the reference member 5, the displacement of the difference d in length, as expressed by a ratio, is given by equation (10):

$$\{d(t)-d(t_0)\}/d(t_0)=\{d(t)/d_0\}-1=(\alpha-\beta)(L_0/d_0)\Delta t \tag{10}$$

If the coefficient of thermal expansion α of the flight tube 2 is negligibly smaller than that of the reference member 5, β, i.e. if β>>α, the ratio of the displacement of the difference d in length for a thermal expansion of each of the flight tube 2 and the reference member 5 is expressed by the following equation (11):

$$\{d(t)-d(t_0)\}/d(t_0)=-\beta(L_0/d_0)\Delta t \tag{11}$$

In summary, except for the case of α=β, it is basically possible to recognize the degree of thermal expansion of the flight tube 5 by measuring the difference d in length. However, the larger the difference between α and β is, the less effective the ($L_0/d_0$)-fold increase in the displacement becomes. Therefore, it is preferable to have a large difference between α and β.

Once more referring to FIG. 1, in the TOFMS according to the present embodiment, the distance between the ion entrance end portion 2*a* of the flight tube 2 and the end portion 5*a* of the reference member 5 (i.e. the difference d in length) is measured, using a strain gauge, capacitance sensor or similar device as the distance measurement sensor 7. Measurement signals produced by the distance measurement sensor 7 are sent to the mass discrepancy information storage section 85. The mass discrepancy information storage section 85 contains data which show the relationship between the magnitude of the measurement signal and the mass discrepancy in the form of a table or calculation formula. The relationship between the magnitude of the measurement signal and the mass discrepancy is reproduceable and barely undergoes a change over time. Therefore, for example, the manufacturer of the device can experimentally determine this relationship and store it in the mass discrepancy information storage section 85 beforehand.

Concurrent with the previously described process of collecting the time-of-flight spectrum data by making ions derived from sample components fly through the flight space 21, the distance measurement sensor 7 measures the distance between the two end portions 2*a* and 5*a*. The mass discrepancy information storage section 85 provides the amount of mass discrepancy corresponding to the measurement signal. Based on previously given mass calibration information which shows the correspondence relationship between the time of flight and the mass-to-charge ratio, the mass converter 82 converts time-of-flight values in the data collected by the TOF spectrum data collector 81 into mass-to-charge ratios to obtain mass spectrum data which show the relationship between the mass-to-charge ratio and the signal intensity. The mass corrector 83 corrects the mass-to-charge ratios based on the information concerning the mass discrepancy obtained from the mass discrepancy information storage section 85. In this manner, the mass discrepancy due to a thermal expansion of the flight tube 2 is corrected. Based on the mass spectrum data in which the mass discrepancy has been corrected, the mass spectrum creator 84 creates a mass spectrum and displays it on the screen of a display unit 9.

As described earlier, the measurement signal by the distance measurement sensor 7 is obtained in almost real time. Therefore, for example, even when the temperature of the flight tube 2 is in a rising phase, an accurate mass discrepancy correction corresponding to the temperature of the flight tube 2 at the time of execution of the mass spectrometry can be performed.

In the previous embodiment, the reference member 5 is placed in contact with the flight tube 2. The reference member 5 does not always need to be in contact with the flight tube 2, but may simply be placed close to the flight tube 2 as long as the reference member 5 can be approximately equal to the flight tube 2 in temperature.

Figure 3:
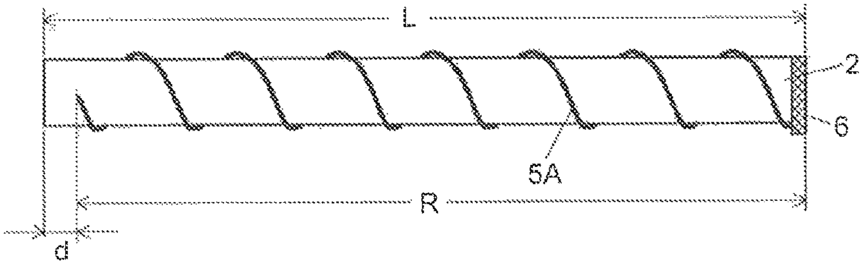
FIG. 3 is a diagram showing another example of the reference member.

The reference member 5 does not always need to have a shape that linearly extends in the same direction as the flight tube 2. It may have a different shape as long as the reproducibility of the displacement for a temperature change is guaranteed. For example, as shown in FIG. 3, a coil-shaped reference member 5A may be wound around the outer surface of the flight tube 2. As in the previous embodiment, one end of the reference member 5A is fixed to one end of the flight tube 2 with the fixture part 6, while the other end of the reference member 5A allows its distance from the other end of the flight tube 2 (the shortest distance or the distance in the axial direction of the flight tube 2) to be measured with the distance measurement sensor 7.

Needless to say, the one end of the reference member 5 or 5A and that of the flight tube 2 do not always need to be fixed to each other. However, fixing these ends conveniently facilitates the measurement of the difference d in length between the two members.

The measurement error correction method based on a temperature-dependent displacement in a measurement device according to the present invention can also be applied in various types of measurement devices other than the TOFMS.

Examples of such devices include an orbitrap mass spectrometer and Fourier transform cyclotron resonance mass spectrometer, both of which are known as mass spectrometers capable of high-accuracy measurements as with the TOFMS. In those types of devices, the measurement accuracy can deteriorate due to a change in the distance between the electrodes in an orbitrap (electric field cell) or magnetic field cell, a change in the length of these electrodes, a change in the inner diameter of a tubular electrode, or other similar changes. Accordingly, the previously described method can be used, for example, in such a manner as to measure the difference in length between a reference member and a specific electrode, or the difference between the length of a reference member and the distance between specific electrodes, and correct a mass discrepancy based on the measured result.

Other examples include an ultraviolet-visible spectrophotometer, Fourier transform infrared spectrophotometer and infrared gas analyzer. In these types of devices, the length of a metallic sample cell can change due to a thermal expansion, causing a change in the optical path length through a sample, or a surface plate on which lenses and other optical elements are fixed can thermally expand, causing a change in the intensity of the light to be cast into the sample. Those factors may also cause a fluctuation in measurement data. The previously described method can also be used in these types of measurement devices, for example, in such a manner as to measure the difference in length between the sample cell and a reference member and correct a mass discrepancy based on the measured result.

It is evident that any modification, change, addition or the like appropriately made within the spirit of the present invention in any aspect other than those already described will also fall within the scope of claims of the present application.

REFERENCE SIGNS LIST

1 . . . Ionization Chamber
11 . . . Ionizer
12 . . . Accelerator
2 . . . Flight Tube
21 . . . Flight Space
3 . . . Detection Chamber
31 . . . Detector
5, 5A . . . Reference Member
6 . . . Fixture Part
7 . . . Distance Measurement Sensor
8 . . . Data Processing Unit
81 . . . TOF Spectrum Data Collector
82 . . . Mass Converter
83 . . . Mass Corrector
84 . . . Mass Spectrum Creator
85 . . . Information Storage Section
9 . . . Display Unit

The invention claimed is:

1. A measurement error correction method based on a temperature-dependent displacement in a measurement device, the measurement error correction method to be used in a measurement device configured to perform a predetermined measurement and acquire measurement data, for correcting an error or discrepancy in measurement data due to a thermal expansion of a specific component member included in the measurement device and having a length contributing to the measurement data, the measurement error correction method comprising:

placing a reference member in a same temperature atmosphere as the component member, the reference member made of a material whose coefficient of thermal expansion is different from a coefficient of thermal expansion of the component member; and measuring a difference in length between the component member and the reference member, with the two members individually demonstrating a thermal expansion in the same temperature atmosphere, and correcting measurement data obtained by a measurement, based on the difference in length.

2. The measurement error correction method based on a temperature-dependent displacement in a measurement device according to claim 1, wherein:

the measurement device is a time-of-flight mass spectrometer, and the component member is a flight tube within which a flight space is formed.

3. The measurement error correction method based on a temperature-dependent displacement in a measurement device according to claim 2, wherein:

the reference member is an elongated member extending in a same direction as the flight tube, and the reference member is arranged so that one end of the reference member and one end of the flight tube are held to be level with each other while a distance between another end of the reference member and another end of the flight tube is to be measured as the difference in length between the two members.

4. A mass spectrometer configured as a time-of-flight type of mass spectrometer having a flight tube within which a flight space is formed, the mass spectrometer comprising:

a) a reference member located in a same temperature atmosphere as the flight tube, the reference member being an elongated object extending in a same direction as the flight tube and made of a material whose coefficient of thermal expansion is different from a coefficient of thermal expansion the flight tube, with one of end of the reference member held to be level with one end of the flight tube;

b) a distance meter for measuring a distance between an end portion of the reference member opposite from a side on which the one end of the reference member is held to be level with the one end of the flight tube, and an end portion of the flight tube opposite from the same side; and c) a correction processor for correcting a time of flight obtained by mass spectrometry performed for a sample or a mass-to-charge ratio obtained by a conversion of the time of flight, based on a result of a measurement by the distance meter.

5. The mass spectrometer according to claim 4, wherein:

the mass spectrometer further comprises a discrepancy information storage section for previously storing a relationship between the result of the measurement by the distance meter and a discrepancy in time of flight or mass-to-charge ratio; and the correction processor is configured to obtain, from the discrepancy information storage section, a discrepancy corresponding to the result of the measurement by the distance meter and correct the time of flight or mass-to-charge ratio.

6. The mass spectrometer according to claim 5, wherein:

the distance meter is a strain gauge or capacitance sensor.

* * * * *